W. T. ROUTSONG.
POTATO SORTER.
APPLICATION FILED MAY 26, 1916.
1,274,085.
Patented July 30, 1918.
2 SHEETS—SHEET 1.
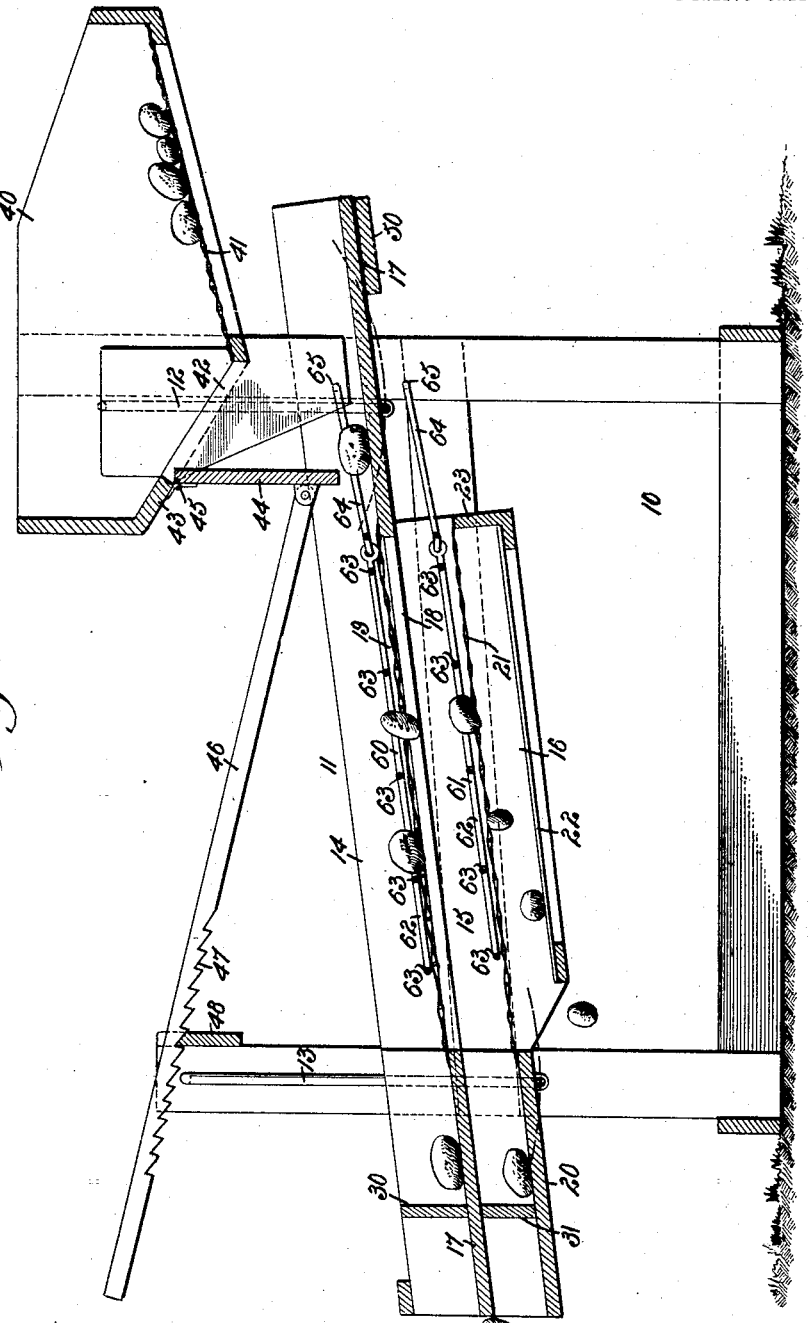
WITNESSES
INVENTOR
Warren T. Routsong
BY
ATTORNEYS W. T. ROUTSONG.
POTATO SORTER.
APPLICATION FILED MAY 26, 1916.
1,274,085.
Patented July 30, 1918.
2 SHEETS—SHEET 2.
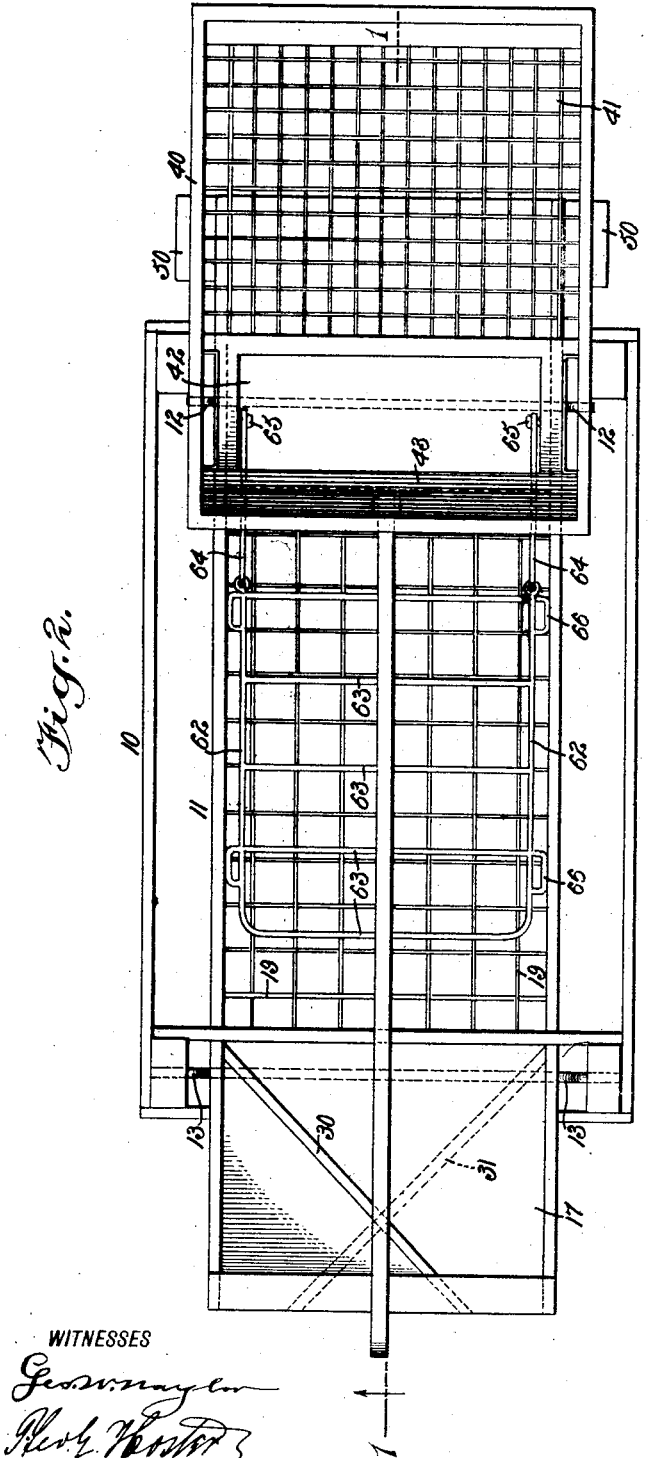
WITNESSES
INVENTOR
Warren T. Routsong
BY 
ATTORNEYS

UNITED STATES PATENT OFFICE.

WARREN T. ROUTSONG, OF TRAVERSE CITY, MICHIGAN.

POTATO-SORTER.

1,274,085.   Specification of Letters Patent.   Patented July 30, 1918.

Application filed May 26, 1916. Serial No. 99,973.

*To all whom it may concern:*

Be it known that I, WARREN T. ROUTSONG, a citizen of the United States, and a resident of Traverse City, in the county of Grand Traverse and State of Michigan, have invented a new and Improved Potato-Sorter, of which the following is a full, clear, and exact description.

The object of the invention is to provide a new and improved potato sorter or grader for potatoes and the like and which is simple and durable in construction, easily moved about from one place to another and arranged to separate the potatoes into large, medium and small sizes, at the same time freeing them from the sand or soil usually adhering to or intermingled with the potatoes when harvested.

In order to accomplish the desired result, use is made of an inclined shaker mounted to swing forward and backward and having triple decks, each deck being provided in its bottom with screening means, the screening means of the upper deck being coarser than the screening means of the second deck and the screening means of the lowermost deck being fine, the two upper decks being provided at their lower ends with deflectors extending obliquely in opposite directions to deliver the assorted large and medium sized potatoes in different piles, the lower end of the lowermost deck terminating a distance from the lower ends of the other two decks to deliver the small potatoes or culls in a separate pile which is separate from the soil dropping through the screening means of the lowermost deck. Use is also made of an agitator overlying the screening means and in the form of a fixed open mesh frame to dislodge any potatoes caught in the meshes of the screening means.

A practical embodiment of the invention is represented in the accompanying drawings forming a part of this specification in which similar characters of reference indicate corresponding parts in all the views.

Figure 1 is a longitudinal central section of the potato sorter on the line 1—1 of Fig. 2;

Fig. 2 is a plan view of the same;

Fig. 3 is a perspective view of the lower end of the shaker; and

Fig. 4 is a perspective view of one of the agitators.

The improved potato sorter is mounted on a suitably constructed frame 10, in which is mounted to swing forward and backward an inclined shaker 11 hung on links 12 and 13 fulcrumed on the main frame 10. By the arrangement described the shaker 11 can be readily swung in the direction of its length either by hand or by power. The shaker 11 is provided with triple decks 14, 15 and 16, of which the upper deck 14 is open at the ends and at the top and its bottom 17 is provided with an opening 18 covered by a coarse screen 19 to allow large-sized potatoes to roll down the screen 19 while medium sized and small potatoes can readily pass through the meshes of the screen 19 and through the opening 18 into the deck 15. The deck 15 has the upper portion of its bottom 20 in the form of a screen 21 of a mesh to allow the small potatoes or culls to pass through the meshes while the medium sized potatoes roll down the screen. The small potatoes or culls drop into the lower deck 16 which is provided in its bottom with a screen 22 in the form of longitudinal bars raised say half an inch apart to allow the small potatoes or culls to roll down the screen while the sand or soil readily drops through the screen to the ground below. The intermediate deck 15 begins a short distance above the opening 18 in the bottom 17 of the upper deck 14 but terminates at its lower end flush with the lower end of the upper deck 14. The lower deck 16 has its upper end 23 closed while the upper end of the intermediate deck 15 is open and the lower end of the lower deck 16 terminates a distance from the lower ends of the other two decks 14 and 15 so that the small potatoes or culls drop to the ground at a point intermediate the pile of sand or soil and the piles of large and medium sized potatoes delivered at the lower ends of the decks 14 and 15. In order to form separate piles of the large and medium sized potatoes, use is made of deflectors 30 and 31 disposed obliquely in opposite directions in the lower ends of the decks 14 and 15 so that the large potatoes delivered by the upper deck 14 pass to one side and the medium sized potatoes to the left, as will be readily understood by reference to the arrows shown in Fig. 3.

The potatoes to be sorted or graded are delivered to the upper end of the uppermost deck 14 and for this purpose use is made of a hopper 40 mounted on the upper end of the main frame 10. The hopper 40 is provided with a V-shaped bottom, of which one portion is provided with an inclined screen 41 down which roll the potatoes to an opening 42 in the other member 43 of the V-shaped bottom. The opening 42 is controlled by a door 44 connected at its upper end by hinges 45 with the member 43 at the upper wall of the opening 42. The door 44 is pivotally connected with a rod 46 provided with ratchet teeth 47 adapted to be engaged with the upper edge of a cross board 48 forming part of the main frame 10. The rod 46 can be readily adjusted by the operator to swing the door 44 into a more or less open position to control the amount of potatoes passing from the hopper 40 by way of the opening 42 onto the upper end of the bottom 17 of the upper shaker deck 14.

It is understood that by imparting a swinging motion to the inclined shaker 11 the potatoes readily roll down the bottom 17 and over the screen 19 on which the medium sized and smaller potatoes drop through the meshes of the screen 19 down into the deck 15 while the larger potatoes keep on rolling down the screen 19 and over the lower end of the bottom 17 to be finally discharged to one side of the machine, as previously explained. The medium and smaller potatoes are separated on the screen 21 and the medium potatoes roll down this screen and onto the lower portion of the bottom 20 to be then discharged to the other side of the shaker in a pile separate from the one containing the large potatoes. The small potatoes or culls roll down the screen 22 and are discharged at the lower end of the deck 16.

In order to aid the movement of the potatoes in their downward travel in the shaker 11 and to separate the sand or soil from the potatoes, use is made of a bumper 50 extending from the sides of the upper end of the shaker 11 and adapted to be bumped against the upper portion of the main frame 10 to produce a percussion action of the shaker for the purpose mentioned.

In order to dislodge any potatoes that may be caught in the meshes of the screens 19 and 21 use is made of agitators 60 and 61 overlying the screens 19 and 21 and alike in construction so that it is only necessary to describe but one in detail. Each agitator is in the form of an open or skeleton frame having side bars 62 connected with each other by spaced crossbars 63, as plainly indicated in Figs. 2 and 4. The upper ends of the side bars 62 are pivotally connected with links 64 fulcrumed at their upper ends at 65 on the main frame 10. When the shaker 11 is swung forward and backward then the crossbars 63 sweep over the meshes of the screens 19 and 21 thus dislodging any potatoes that may have been caught in the meshes of the said screens 19 and 21. The side bars 62 are provided with guides 66 slidingly engaging the inner faces of the sides of the decks 14 and 15 so as to hold the agitators 60 and 61 against lateral movement.

The potato sorter shown and described is simple and durable in construction and composed of comparatively few parts not liable to get easily out of order.

Having thus described my invention, I claim as new and desire to secure by Letters Patent:

1. A potato sorter provided with an inclined shaker having in its bottom a screen, means for supporting the shaker to allow of swinging the same in the direction of its length, an open mesh agitator overlying the screen and having guides at the sides in sliding contact with the sides of the shaker, and a link fixed at one end and pivotally connected with the end of the said agitator, said agitator held against longitudinal movement within the shaker and with respect to the same.

2. In a potato sorter, a main frame, an inclined shaker having in its bottom a screen, means for supporting the shaker in the frame to allow it to swing in the direction of its length, an agitator formed of side bars and cross bars and overlying the screen of the shaker, said agitator being provided with guide members projecting from its side bars and engaging the sides of the shaker, and links having one end pivoted to the side bars of the agitator and their other ends pivoted to the frame, said agitator being held against longitudinal movement within the shaker and with respect to the same, by said links.

WARREN T. ROUTSONG.